(12) United States Patent
Steinbauer et al.

(10) Patent No.: US 9,487,164 B2
(45) Date of Patent: Nov. 8, 2016

(54) CURRENT GENERATING UNIT

(75) Inventors: Michael Steinbauer, Wald (AT); Gernot Fuckar, Graz (AT); Robert Berger, Strallegg (AT); Andreas Nimmervoll, Ramsau (AT); Aldo Bregant, Graz (AT)

(73) Assignee: AVL LIST GMBH, Graz (AT)

( * ) Notice: Subject to any disclaimer, the term of this patent is extended or adjusted under 35 U.S.C. 154(b) by 645 days.

(21) Appl. No.: 13/988,336

(22) PCT Filed: Nov. 17, 2011

(86) PCT No.: PCT/EP2011/070333
§ 371 (c)(1),
(2), (4) Date: May 19, 2013

(87) PCT Pub. No.: WO2012/066067
PCT Pub. Date: May 24, 2012

(65) Prior Publication Data
US 2013/0241283 A1 Sep. 19, 2013

(30) Foreign Application Priority Data
Nov. 18, 2010 (AT) .................. A 1910/2010

(51) Int. Cl.
*F02B 63/04* (2006.01)
*B60R 16/03* (2006.01)
*B60K 11/02* (2006.01)
(Continued)

(52) U.S. Cl.
CPC ............. *B60R 16/03* (2013.01); *B60K 11/02* (2013.01); *B60L 11/123* (2013.01); *F02B 63/04* (2013.01); *H02K 7/1815* (2013.01); *B60K 6/24* (2013.01); *B60K 6/26* (2013.01); *B60L 2270/40* (2013.01); *F01P 2050/24* (2013.01); *F01P 2060/04* (2013.01); *H02K 9/19* (2013.01); *Y02T 10/6217* (2013.01); *Y02T 10/6295* (2013.01); *Y02T 10/641* (2013.01); *Y02T 10/7077* (2013.01)

(58) Field of Classification Search
CPC .................................. B60K 11/02; F01P 1/02
See application file for complete search history.

(56) References Cited

U.S. PATENT DOCUMENTS

| | | | | | |
|---|---|---|---|---|---|
| 4,987,953 | A | * | 1/1991 | Hedstrom | F01P 3/20 123/41.31 |
| 5,058,660 | A | * | 10/1991 | Hedstrom | F01P 3/20 123/41.31 |

(Continued)

FOREIGN PATENT DOCUMENTS

| | | | | | |
|---|---|---|---|---|---|
| AT | 505950 | A2 | * | 5/2009 | ............ B60K 6/405 |
| DE | 3601193 | A1 | | 7/1987 | |

(Continued)

*Primary Examiner* — Thienvu Tran
*Assistant Examiner* — Pinping Sun
(74) *Attorney, Agent, or Firm* — Jordan IP Law, LLC; Todd A. Vaughn

(57) ABSTRACT

A current generating unit configured to extend the range of an electric vehicle, including an internal combustion engine formed by a rotary-piston engine, and at least one electric machine cofigured to be excited by permanent magnets and arranged coaxially to the internal combustion engine. The internal combustion engine and the electric machine are arranged as a unit and include a common housing and a common cooling system, with at least one cooling channel arrangement disposed on the electric side and configured to cool an electric component in the cooling circuit of the cooling system upstream of at least one cooling channel arrangement of the internal combustion engine.

18 Claims, 3 Drawing Sheets

(51) Int. Cl.
*H02K 7/18* (2006.01)
*B60L 11/12* (2006.01)
*H02K 9/19* (2006.01)
*B60K 6/24* (2007.10)
*B60K 6/26* (2007.10)

(56) References Cited

U.S. PATENT DOCUMENTS

| | | | | |
|---|---|---|---|---|
| 5,121,715 | A * | 6/1992 | Nogami | F01P 11/12 123/198 E |
| 6,772,715 | B2 * | 8/2004 | Pfeffinger | F01P 3/20 123/41.31 |
| 7,424,869 | B2 * | 9/2008 | Haase | F01P 7/16 123/41.1 |
| 2002/0189800 | A1 * | 12/2002 | Hohl | F01P 3/20 165/287 |
| 2009/0044961 | A1 * | 2/2009 | Schmid | B25D 17/22 173/46 |
| 2010/0068983 | A1 * | 3/2010 | Williams | B60K 6/46 454/184 |
| 2010/0079946 | A1 * | 4/2010 | Bharani | H02K 5/20 361/695 |

FOREIGN PATENT DOCUMENTS

| | | |
|---|---|---|
| DE | 4020416 A1 | 6/1990 |
| DE | 4020176 A1 | 1/1991 |
| EP | 1323906 A2 | 7/2003 |
| JP | 2001132564 A | 5/2001 |
| WO | 02052131 A1 | 7/2002 |

* cited by examiner

CURRENT GENERATING UNIT

CROSS-REFERENCE TO RELATED APPLICATIONS

The present application is a National Stage Application of PCT International Application No. PCT/EP2011/070333 (filed on Nov. 17, 2011), under 35 U.S.C. §371, which claims priority to Austrian Patent Application No. A 1910/2010 (filed on Nov. 18, 2010), which are each hereby incorporated by reference in their respective entireties.

TECHNICAL FIELD

The invention relates to a current generating unit, especially for extending the range of an electric vehicle, comprising an internal combustion engine especially formed by a rotary-piston engine, and at least one electric machine preferably excited by permanent magnets and arranged coaxially to the internal combustion engine, with the internal combustion engine and the electric machine being arranged as a unit and comprising a common housing and a common cooling system, with especially at least one cooling channel arrangement disposed on the electric side being arranged for cooling an electric component in the cooling circuit of the cooling system upstream of at least one cooling channel arrangement of the internal combustion engine.

BACKGROUND

AT 505 950 B1 describes a current generating unit for extending the range of an electric vehicle, comprising a rotary-piston engine and a generator which is arranged coaxially to the output shaft of the internal combustion engine. The internal combustion engine and the generator are arranged as a unit and comprise a common cooling system. The cooling water reaches water chambers of the generator and the internal combustion engine from a coolant pump and will be supplied thereafter to the air/water heat exchangers. The cooling channels of the generator and the internal combustion engine are directly flow-connected to each other without any separate lines.

Furthermore, a unit consisting of a current generator and an internal combustion engine is known from DE 3 601 193 A1, with the internal combustion engine and the generator having a common cooling water circuit, with the line originating from the generator and discharging the generator heat being connected to the cooling water inlet of the engine.

DE 4 020 416 A1 describes a generator with armature shaft cooling, with the generator and a drive motor formed by an internal combustion engine having a common cooling system.

WO 02/052132 A1 describes a cooling system for a motor vehicle with at least one coolant pump, with a starting generator and power electronics being included in the cooling circuit. The cooling of the power electronics occurs parallel to the cooling of the starting generator.

The specification DE 40 20 176 A1 describes a power unit for the power supply of a motor vehicle whose cooling circuit is connected to the cooling circuit of the motor vehicle.

In the current generating unit, the individual components have different heat inputs and different optimal operating temperatures.

SUMMARY

It is the object of the invention to achieve the best possible heat dissipation for a current generating unit of the kind mentioned above which is adapted to the needs of the components.

This is achieved in accordance with the invention in such a way that the cooling channel arrangement on the electric side comprises a cooling channel arrangement part for cooling the power electronics and a cooling channel arrangement part for cooling the electric machine, and that the cooling channel arrangement part for cooling the power electronics is arranged upstream of the cooling channel arrangement part for cooling the electric machine in the cooling circuit of the cooling system. This allows optimally tempering the power electronics which requires relatively low operating temperatures.

It is provided in an embodiment in accordance with the invention that an oil cooler is arranged in the cooling circuit of the cooling system downstream of at least one cooling channel arrangement of the internal combustion engine.

As a result, all components which require a lower operating temperature than the internal combustion engine are cooled before the internal combustion engine by the cooling strand of the cooling system. The power electronics can be integrated in this case in a housing arranged jointly for the internal combustion engine and the electric machine. All parts conducting alternating current can therefore be arranged within the housing. As a result, the overall size can be reduced and the electromagnetic compatibility can be increased.

It can further be provided in a further development of the invention that an electric water pump, which is preferably controlled by way of a characteristic map, is arranged in the cooling circuit of the cooling system outside of the housing, with preferably the electric water pump being arranged between the front axle and the rear axle of the vehicle, and the housing is positioned in the region of the front or the rear axle. It is also possible to arrange the electric water pump in the engine compartment.

It is also possible in the case of a respective heat exchanger configuration to arrange the oil cooler upstream of the electric machine in the cooling circuit of the cooling system and/or the power electronics downstream of the internal combustion engine in the cooling circuit of the cooling system. It needs to be taken into account in particular in this case that the electric components are not overheated.

It can be provided in an alternative embodiment of the invention and in the case of a respective configuration of the cooling channel arrangements that at least one cooling channel arrangement on the electric side for cooling an electric component, preferably the electric machine, is arranged in the cooling circuit of the cooling system downstream of at least one cooling channel arrangement of the internal combustion engine. Furthermore, the cooling channel arrangement part for cooling the power electronics can be arranged in the cooling circuit of the cooling system downstream of at least one cooling channel arrangement for cooling the internal combustion engine and/or the oil cooler upstream of at least one cooling channel arrangement on the electric side, preferably for cooling the electric machine.

Rotary-piston engines comprise (as seen about the axis of the eccentric shaft) a cold angular segment region of the housing in the inlet region and a hot angular segment region of the housing in the combustion and outlet region. These two angular segment regions have different heat inputs and therefore show different cooling requirements.

For the purpose of taking into account different heat inputs and component temperatures of the electric machine and the internal combustion engine it can further be provided with the scope of the invention that the cooling channel arrangement on the electric side and a first cooling arrangement of the first lateral housing part on the piston side are arranged at least partly in parallel in the cooling circuit of the cooling system, with preferably a second coolant flow which is guided through the cooling channel arrangement on the electric side and thereafter to the first cooling channel arrangement on the piston side being smaller than a first coolant flow supplied substantially directly to the first cooling channel arrangement on the piston side and by mostly circumventing the cooling channel arrangement on the electric side.

After flowing through the cooling channels in the first cooling channel arrangement on the piston side in the hot angular segment region of the internal combustion engine the first coolant flow can join with the second coolant flow in the region of a second cooling channel arrangement on the piston side of the second housing part after it has flowed through the cooling channels in the first cooling channel arrangement on the piston side and the central cooling channel arrangement in the cold angular segment region. Simulations have illustrated that an especially advantageous tempering of the individual components can be achieved when the volume flow of the first coolant flow is approximately 70% to 90%, preferably 80% to 88%, of the entire coolant flow which is preferably supplied to the housing and/or which is discharged from the second cooling channel arrangement of the second housing part on the piston side. This allows an excessive cooling of the hot angular segment regions.

DRAWINGS

The invention will be explained below in closer detail by reference to the drawings, which schematically illustrate as follows.

DESCRIPTION

Figure 1:
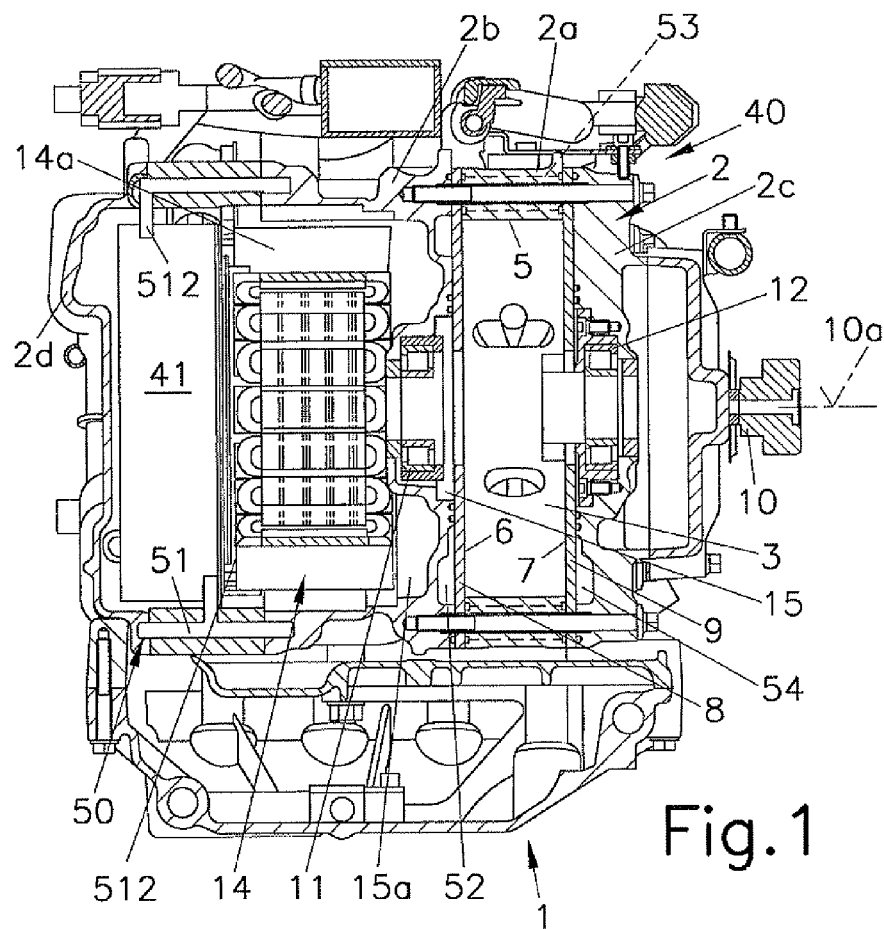
FIG. 1 illustrates a current generating unit in accordance with the invention in a longitudinal sectional view.

FIG. 1 illustrates a current generating unit 40 (range extender), especially for extending the range of an electric vehicle 90, with a rotary-piston engine 1 and an electric machine 14 which is excited by permanent magnets, for example, being arranged in a housing 2. The housing 2 comprises a chamber 3 in which a rotary piston is revolvingly arranged along a trochoidal running surface 5 of the housing 2. The chamber 3 is formed by the trochoidal running surface 5 and by lateral running surfaces 6, 7. The housing 2 comprises a central housing part 2a forming the trochoidal running surface 5, a lateral first housing part 2b and a second lateral housing part 2c. Furthermore, the housing 2 may comprise a first or second lateral plate 8, 9 between the central housing part 2a and the lateral housing part 2 b and/or the lateral housing part 2c, which lateral plate is flat on both sides and which forms the lateral running surfaces 6 and 7. Furthermore, an intermediate housing part 2e for accommodating power electronics 41 can optionally be provided between the cover part 2d and the lateral first housing part 2b which accommodates the electric machine 14. If the power electronics 41 is arranged outside of the housing 2 or integrated in the cover part 2d, the intermediate housing part 2e can be omitted. It is also possible to integrate the power electronics 41 in the first housing part 2b.

An eccentric shaft 10 which is arranged in an inner housing space 15 in the first and second housing part 2b, 2c and which is driven by the rotary piston 4 is rotatably held via bearings 11, 12 which are arranged as rolling bearings for example. The rotor 13 of the electric machine 14 which is arranged in the same housing 2 is arranged coaxially to the eccentric shaft 10.

The lateral first housing part 2b which accommodates the first bearing 11 comprises a bell-shaped cylindrical jacket area 2b', which opens a substantially cylindrical interior space 15a in which the rotor 13 and the stator 14a of the electric machine are arranged. The cylindrical interior space 15a is closed off by a cover part 2d adjacent to the housing part 2b.

It is especially advantageous if the entire power electronics 41 of the electrical machine 14 are integrated in the cylindrical interior space 15a or in the cover part 2d. As a result, all alternating current lines can be housed within the housing 2, as a result of which the electromagnetic compatibility can be improved substantially. Only direct current cables lead to the current generating unit 40. As a result, the number of connections can therefore be reduced to a minimum.

In order to prevent overheating of the electric components and for dissipating the heat occurring during the combustion in the rotary-piston engine 1, a cooling system 50 is provided which comprises cooling channel arrangements 51, 52, 53, 54 which are formed into the housing parts 2d (cover part), 2e (intermediate housing part), 2b (lateral first housing part), 2a (central housing part) and 2c (lateral second housing part), wherein the individual components of the group consisting of the power electronics 41, the electric machine 14 and an oil cooler 35 (which is optionally integrated in the oil sump of the current generating unit 40 and is not illustrated in closer detail in FIG. 1) are cooled successively. This allows maintaining different component-specific temperature levels. In the embodiment as illustrated in FIG. 1, the coolant flows successively through the parts of the housing consisting of the cover part 2d, the first housing part 2b, the central housing part 2a, the second lateral plate 9 and the second housing part 2c. The coolant entrance into the current generating unit 40 is arranged in the region of the cover part 2d, the intermediate housing part 2e or the first housing part 2b, and the coolant outlet from the current generating unit 40 is arranged in the region of the second housing part 2c.

An annular cooling channel arrangement 51 around the electric machine 14 and the power electronics 41 can be formed partly by the first housing part 2b and the cover part 2d, and optionally also by the intermediate housing part 2e.

The cooling channel arrangement 51 on the electric side in the first housing part 2b (and optionally also in the cover part 2d and the intermediate housing part 2e) is flow-connected directly within the housing 2 and without any external lines to the first coolant arrangement 52 on the piston side in the lateral first housing part 2b, the central coolant arrangement 53 in the central housing part 2a and the second coolant arrangement 54 on the piston side in the lateral second housing part 2c.

Figure 3:
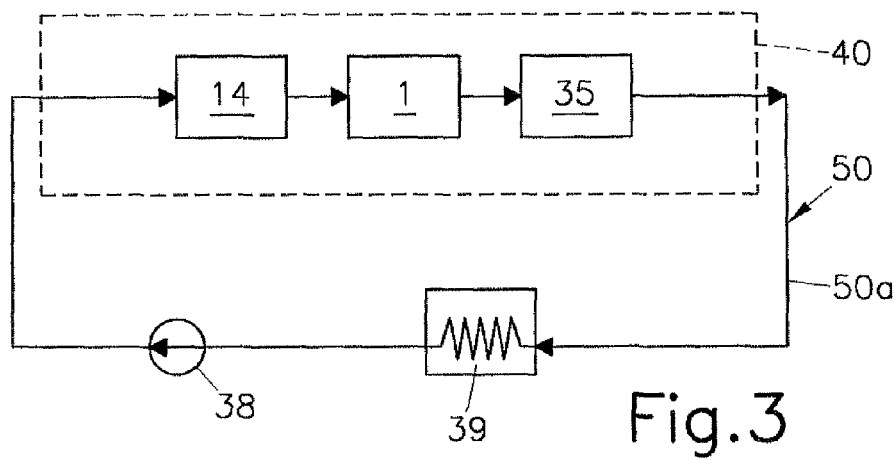
FIG. 3 illustrates a cooling circuit of a current generating unit in accordance with the invention in a first embodiment.

FIG. 3 illustrates a variant, wherein coolant flows through the cooling channel arrangements 51, 52, 53, 54 of the electric machine 14, the rotary-piston engine 1 and the oil cooler 35 in the cooling circuit 50a of the cooling system 50 in the current generating unit 40. The hot coolant exiting from the current generating unit will be recirculated back to the current generating unit 40 via the vehicle radiator 36 and the electric water pump 37 which is advantageously controlled by way of a characteristic map.

Figure 4:
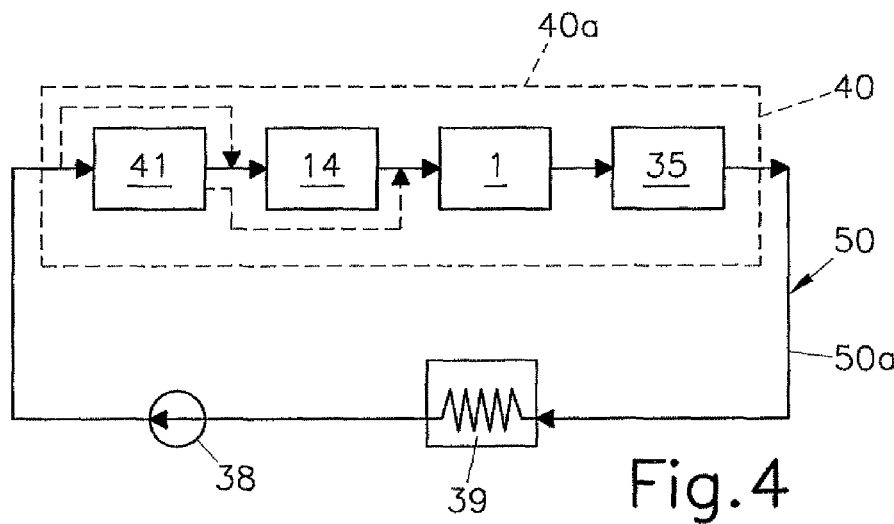
FIG. 4 illustrates a cooling circuit in a second embodiment.

The cooling system 50 illustrated in FIG. 4 differs from FIG. 3 in such a way that power electronics 41 is additionally cooled before or simultaneously with the electric machine 14. The cooling channel arrangement 51 on the electric side comprises a cooling channel arrangement 511 for cooling the power electronics 41 and a cooling channel arrangement 512 for cooling the electric machine 14. As is indicated by the dashed lines in FIG. 4, coolant can flow at least partly in parallel through the cooling arrangement parts 511 for cooling the power electronics 41 and 512 for cooling the electric machine 512.

Figure 5:
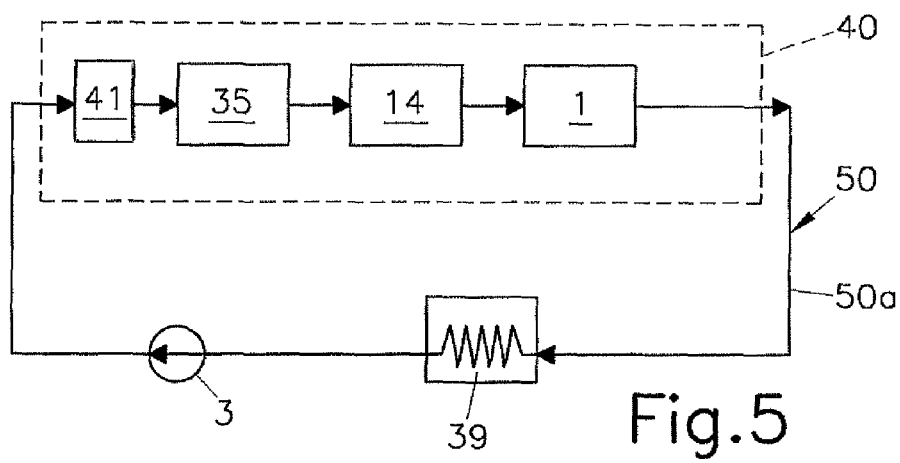
FIG. 5 illustrates a cooling circuit in a third embodiment.
Figure 6:
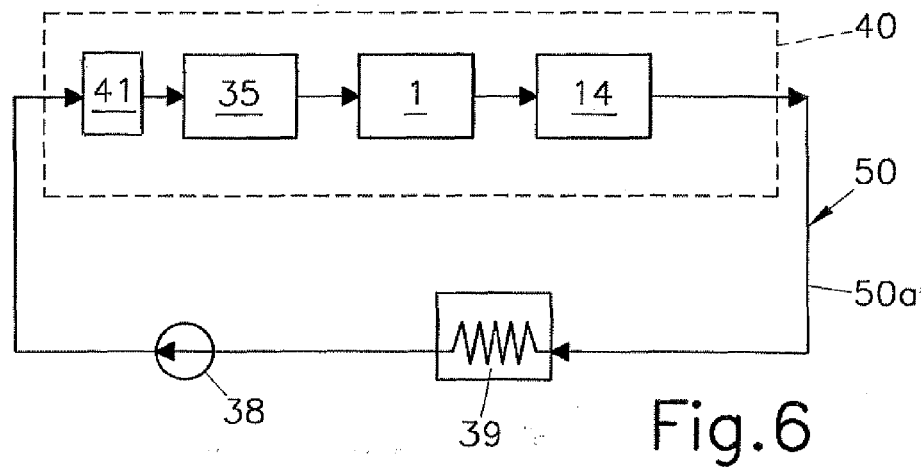
FIG. 6 illustrates a cooling circuit in the fourth embodiment.
Figure 7:
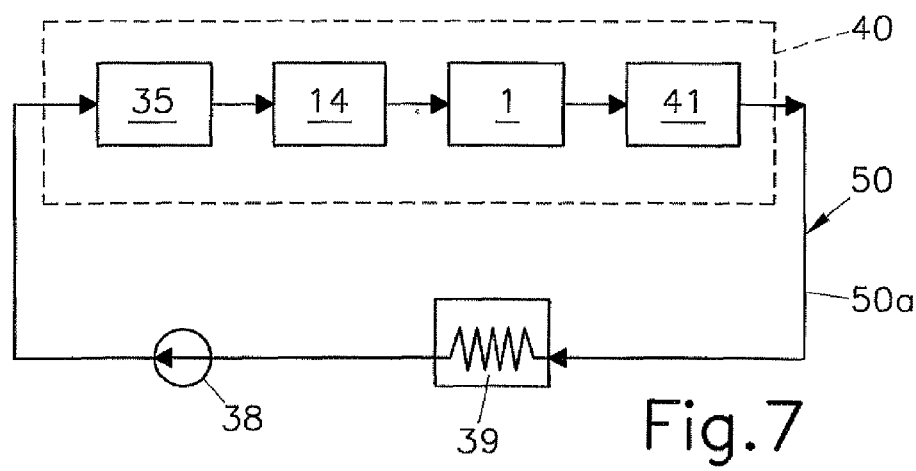
FIG. 7 illustrates a cooling circuit in a fifth embodiment.

The oil cooler 35 in the cooling circuit 50a can also be arranged upstream of the electric machine 14 as a modification of the embodiment as illustrated in FIG. 3 and FIG. 4, which is illustrated in FIG. 5. It is also possible that the rotary-piston engine 1 is positioned upstream of the electric machine 14 (FIG. 6). The power electronics can advantageously be arranged upstream of the oil cooler. It is also possible to arrange the power electronics 41 in the cooling circuit 50a on the output side from the current generating unit 40 downstream of the electric machine 14 and the rotary-piston engine 1, as illustrated in FIG. 7.

Figure 2:
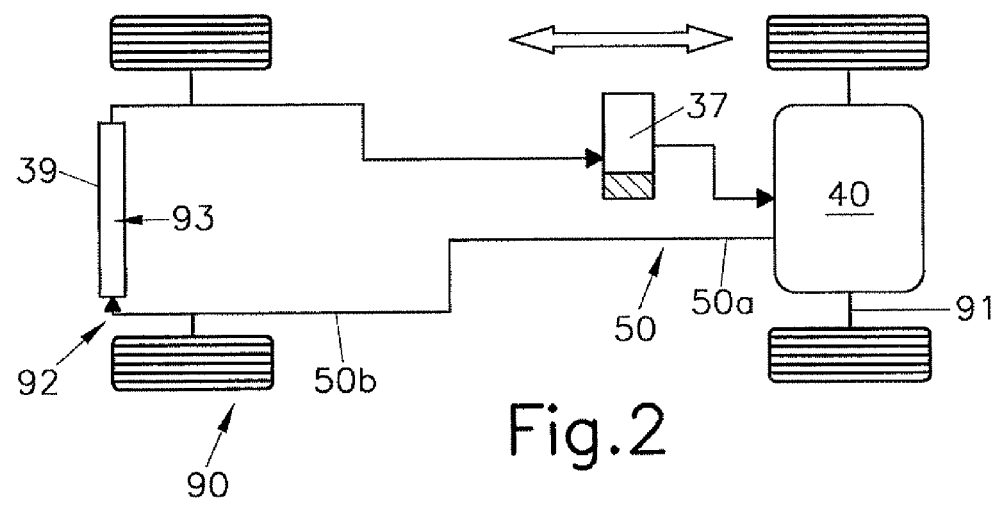
FIG. 2 illustrates an electric vehicle with a current generating unit in accordance with the invention.

As is illustrated in FIG. 2, the current generating unit 40 can be arranged in the region of the rear axle 91 of the electric vehicle 90, wherein the cooling circuit 50a can be connected to the cooling circuit 50b of the vehicle cooling system 92 which is provided for the cooling of the electric drive motors. The cooling of the cooling medium of the common cooling system 50 occurs via the vehicle radiator 39. For reasons of weight and overall size, the electric water pump 38 can be arranged remote from the current generating unit 40 before the rear axle 91, as seen in the travelling direction of the electric vehicle 90. This allows fulfilling both the specific requirements placed on the electric water pump 38 and positively influencing the weight distribution in the vehicle 90 at the same time.

Figure 8:
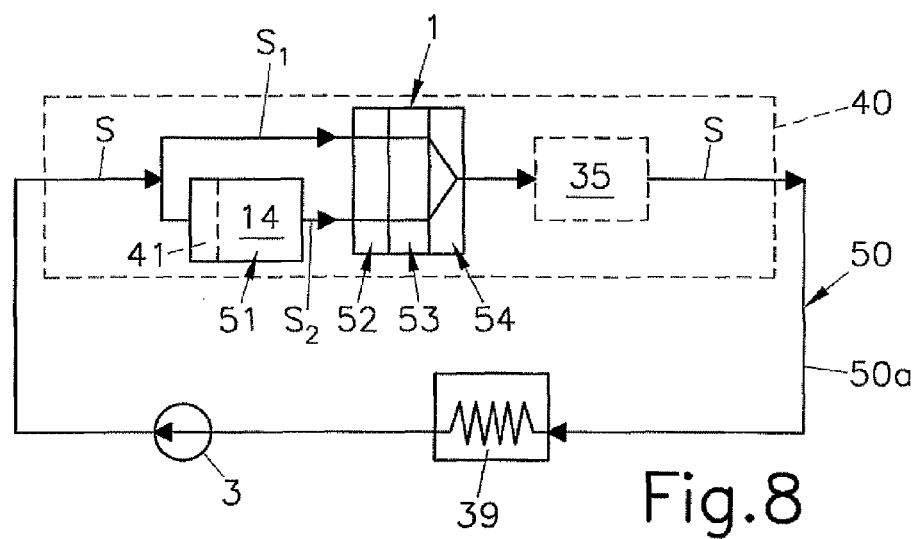
FIG. 8 illustrates a cooling circuit in a sixth embodiment.

FIG. 8 illustrates an embodiment in which the electric machine 14 and the rotary-piston engine 1 are arranged behind one another in the cooling circuit 50a of the cooling system 50, with a first coolant flow S1, which comprises approximately 70% to 90% of the entire volume flow S of the cooling circuit 50a that enters into or exits from the current generating unit 40, being guided at least predominantly past the cooling channel arrangement 51 on the electric side of the electric machine 14 and optionally also the power electronics 41. A second coolant flow S2 with only approximately 10% to 30% of the entire volume flow S flows through the cooling channel arrangement 51 on the electric side. The two coolant flows S1 and S2 flow through separate cooling channels through the cooling channel arrangement 52 on the piston side and the central cooling channel arrangement 53, and join each other in the region of the second cooling channel arrangement 54 on the piston side into a common volume flow S which is optionally guided downstream of the rotary piston engine 1 through an oil cooler 35.

What is claimed is:

1. A current generating unit for an electric vehicle, comprising:
    a housing;
    an internal combustion engine arranged in the housing, and which comprises a rotary-piston engine and which is arranged as a unit in the housing with an electric machine;
    at least one electric machine arranged in the housing coaxially to the internal combustion engine, and configured to be excited by permanent magnets;
    power electronics arranged in the housing; and
    a cooling system having a cooling circuit including at least one first cooling channel arrangement disposed on an electric side of the at least one electric machine, and configured to cool the at least one electric machine upstream of at least one second cooling channel arrangement configured to cool the internal combustion engine,
    wherein the at least one first cooling channel arrangement and the at least one second cooling channel arrangement are arranged at least partly in parallel in the cooling circuit of the cooling system,
    wherein the at least one first cooling channel arrangement comprises a first cooling channel arrangement part configured to cool the power electronics and a second cooling channel arrangement part configured to cool the at least one electric machine and arranged downstream of the first cooling channel arrangement part,
    wherein a second coolant flow which is guided through the at least one first cooling channel arrangement and thereafter the at least one second cooling channel arrangement is smaller than a first coolant flow supplied to the at least one second cooling channel arrangement in a direct way, and which circumvents the at least one first cooling channel arrangement.

2. The current generating unit of claim 1, further comprising an oil cooler arranged in the cooling circuit upstream of the internal combustion engine.

3. The current generating unit of claim 2, wherein the oil cooler is arranged in the cooling circuit downstream of the at least one second cooling channel arrangement.

4. The current generating unit of claim 1, further comprising an oil cooler arranged in the cooling circuit upstream of the at least one first cooling channel arrangement and configured to cool the electric machine.

5. The current generating unit of claim 1, wherein the power electronics is arranged in the housing for the internal combustion engine and the electric machine.

6. The current generating unit of claim 1, further comprising:
    a vehicle cooling system configured to cool an electric drive system and which is fluidically connected with the cooling circuit of the cooling system;
    a heat exchanger; and
    an electric water pump arranged upstream of the housing and downstream of the heat exchanger.

7. The current generating unit of claim 1, wherein the at least one first cooling channel arrangement and the at least one second cooling channel arrangement are respectively arranged in the housing.

8. The current generating unit of claim 1, wherein the at least one first cooling channel arrangement and the at least one second cooling channel arrangement are directly fluidically connected to each other directly within the housing without conduits configured to cool the electric components and the internal combustion engine.

9. The current generating unit of claim 1, wherein after flowing through the cooling channels in the at least one second cooling channel arrangement in a hot angular segment region, the first coolant flow is configured to merge with the second coolant flow after the second coolant flow has flowed through cooling channels in the at least one second cooling channel arrangement in a cold angular segment region.

10. The current generating unit of claim 1, wherein the volume flow of the first coolant flow is approximately 80% to 88% of the entire coolant flow which is supplied to the housing and/or which is discharged from the at least one second cooling channel arrangement.

11. A current generating unit for an electric vehicle, comprising:
an internal combustion engine;
an electric machine arranged coaxially to the internal combustion engine in a common housing, and having a common cooling system with the internal combustion engine,
wherein the cooling system includes a first cooling channel arrangement disposed on an electric side of the electric machine and configured to cool the electric machine, and plurality of second cooling channel arrangements, which is configured to cool the internal combustion engine, and which is arranged downstream of and in parallel to the first cooling channel arrangement,
wherein a second coolant flow which is guided through the first cooling channel arrangement and thereafter the second cooling channel arrangements is smaller than a first coolant flow supplied to the second cooling channel arrangements in a direct way, and which circumvents the first cooling channel arrangement.

12. The current generating unit of claim 11, wherein:
the first cooling channel arrangement comprises a first cooling channel arrangement part; and
the electric machine is arranged in the cooling circuit upstream of the plurality of second cooling channel arrangements.

13. The current generating unit of claim 12, further comprising power electronics in the cooling circuit.

14. The current generating unit of claim 13, wherein the first cooling channel arrangement comprises a second cooling channel arrangement part configured to cool the power electronics.

15. The current generating unit of claim 14, wherein the first cooling channel arrangement part is arranged upstream of the second cooling channel arrangement part.

16. The current generating unit of claim 14, wherein the first cooling channel arrangement part is arranged downstream of the plurality of second cooling channel arrangements.

17. The current generating unit of claim 14, wherein the first cooling channel arrangement part is arranged downstream of the plurality of second cooling channel arrangements.

18. A current generating unit for an electric vehicle, comprising:
a rotary-piston engine;
at least one electric machine arranged coaxially to the rotary piston engine in a common housing and with a common cooling system as the rotary-piston engine; and
power electronics,
wherein the cooling system comprises:
a first cooling channel arrangement configured to cool the electric machine, and comprises a first cooling channel arrangement part configured to cool the power electronics and a second cooling channel arrangement part configured to cool the electric machine and arranged downstream of the first cooling channel arrangement part; and
a plurality of second cooling channel arrangements of the rotary-piston engine arranged in parallel to the first cooling channel arrangement; and
a second coolant flow which is guided through the first cooling channel arrangement and thereafter the second cooling channel arrangements is smaller than a first coolant flow supplied to the second cooling channel arrangements in a direct way, and which circumvents the first cooling channel arrangement.

* * * * *